April 5, 1966  E. C. W. FIELDER  3,244,243
WEIGHING OF A LOAD CARRIED BY A CRANE
Filed March 1, 1963  2 Sheets-Sheet 1

Inventor
ERIC CHARLES WILLIAM FIELDER
By
Browne, Schuyler & Beveridge
Attorneys

April 5, 1966   E. C. W. FIELDER   3,244,243
WEIGHING OF A LOAD CARRIED BY A CRANE
Filed March 1, 1963   2 Sheets-Sheet 2

Inventor
ERIC CHARLES WILLIAM FIELDER
By
Browne, Schuyler & Beveridge
Attorneys

United States Patent Office 3,244,243
Patented Apr. 5, 1966

3,244,243
WEIGHING OF A LOAD CARRIED BY A CRANE
Eric C. W. Fielder, Southend-on-Sea, England, assignor to E. K. Cole Limited, Southend-on-Sea, England
Filed Mar. 1, 1963, Ser. No. 262,266
Claims priority, application Great Britain, Mar. 1, 1962, 7,946/62
10 Claims. (Cl. 177—211)

This invention relates to apparatus for use with lifting mechanism (e.g., a crane) for a load to indicate its weight. Heretofore it has been usual to insert a weight measuring device in the cable supporting the load and, in use, to arrest the cable for a short interval of time whilst the weight of the load was being indicated or recorded. The arresting of the load is inconvenient and time wasting and an object of the invention is an improved means whereby the weighing may be accurately determined without the necessity of arresting the load.

According to the invention an apparatus for measuring the load on a crane or the like comprises a load cell adapted to give an electrical output proportional to the force exerted by the load, a means for providing an electrical output which is a function of the first differential of the load velocity with time and a means for obtaining a quotient of the two outputs to represent the true weight of the load. A number of such readings may be taken and an average obtained to increase the overall accuracy.

Figure 1:
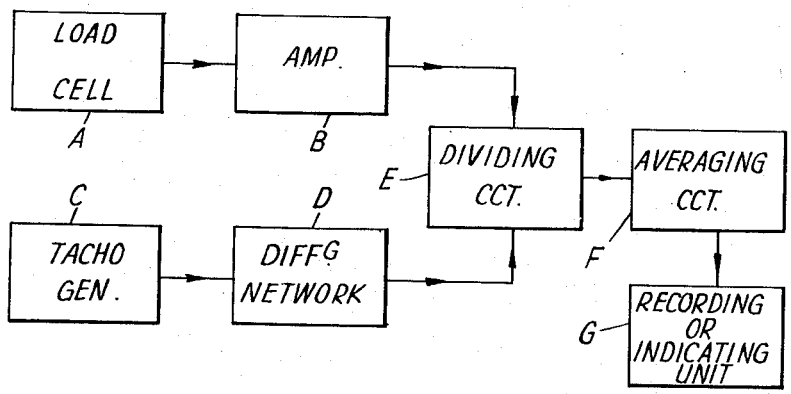
Figure 2:
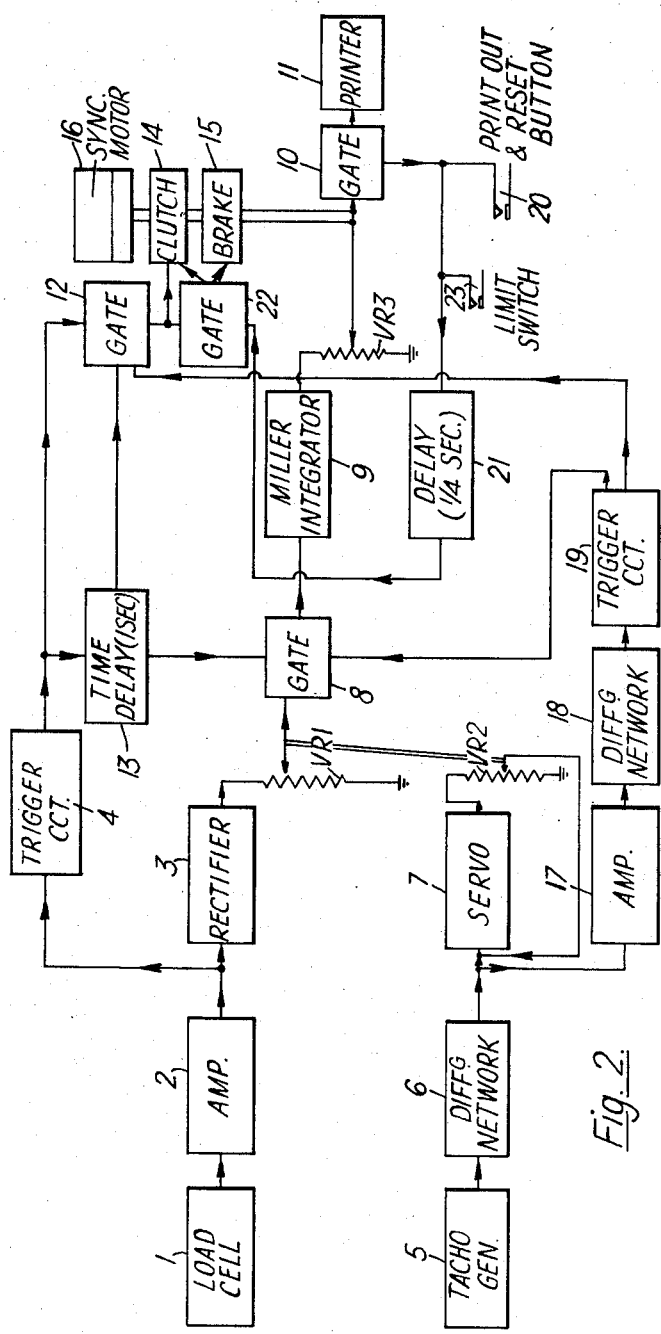

The above and other features of the invention will be more readily understood by a perusal of the following description having reference to the accompanying drawings in which FIGURE 1 is a block schematic diagram of a device in a simple form according to the invention and FIGURE 2 is a block schematic diagram of a more elaborate form thereof.

In FIGURE 1 a load cell A is coupled in the load supporting cable of a crane near the hook and is arranged in a circuit so that its impedance changes are translated into electric currents which are fed to an amplifier B. A tacho generator C is connected to the winching mechanism of the crane so that the generator output is directly proportional to the upward or downward velocity of the load. This output is fed to a differentiating network D which delivers an electrical output which is the first differential of the velocity of the load with respect to time. The outputs of B and D are fed to a dividing circuit E which provides at its output a quotient of the input from B and the input from D. The output from E is directly proportional to the weight of the load and can be arranged to give a direct reading of this weight. For more accuracy it is preferable to take the average of several readings taken over a predetermined short period of time. This is shown in the drawing by taking the output from E, feeding it to an averaging circuit F and thence to a recording or indicating unit G.

The circuits indicated by the rectangular blocks may take various forms as will be understood by any electronics engineer.

The description of FIGURE 2 is best given by reference to its mode of operation:

When the load is lifted, a signal from the load cell 1 is amplified by the amplifier 2. The output from the amplifier is rectified by the rectifier 3 and applied to the potentiometer VR1. The voltage across the whole of VR1 is thus proportional to the instantaneous force applied to the load cell. When the signal from the amplifier 2 reaches a predetermined level, say corresponding to approximately one-tenth of the full output of the load cell, a signal is obtained from a trigger circuit 4. This signal initiates the weighing operation.

The speed of a tacho generator 5 is arranged to be proportional to the speed of the hoist rope and hence the output voltage of the generator is proportional to the velocity of the load. This voltage is applied to a differentiating network 6, the output from which is proportional to the acceleration of the load. A positional servo 7 is used to rotate ganged potentiometers VR1, VR2, so that the angular position of the shaft is a function of the output of the differentiating network and hence to the acceleration of the load. The output from VR1 is thus proportional to the instantaneous value of the force applied to the load cell divided by a quantity whose value depends on the acceleration of the load. The signal from VR1 may be modified by an appropriate electrical network so as to give a signal which is inversely proportional to load acceleration or, as will be referred to hereinafter, which is inversely proportional to 1+acceleration.

A gate 8 under the appropriate conditions couples the output of the potentiometer VR1 to a Miller integrator 9. The voltage output of the Miller integrator is proportional to mass multiplied by time. This voltage is applied to a potentiometer VR3. The position of the shaft of this potentiometer is arranged to be a function of time. The law of the potentiometer is chosen so that the voltage of its moving contact is proportional to mass. This voltage is connected through a gate 10 to a printer 11.

When the weighing cycle is initiated by the signal from the trigger circuit 4 a gate 12 is opened after a time delay of approximately 1 second, obtained from a delay circuit 13. This enables the trigger signal from 4 to engage a clutch 14 and to disengage a brake 15 thus causing a synchronous motor 16 to commence the shaft rotation of the potentiometer VR3.

A useful signal from the VR1 cannot be obtained unless the servo system 7 is operating within its proportional band and the angular position of VR1 is proportional to the acceleration of the load. These conditions will in general not obtain when the acceleration of the load is changing violently. To ensure that the output from VR1 is not used in these circumstances, a tapping is taken from the network 6 through an amplifier 17 to a differentiating network 18. When the output from the differentiating network 18 exceeds a predetermined level, signals are obtained from a trigger circuit 19. One of these signals is used to close gate 8 and to prevent the output from VR1 being integrated by the Miller integrator 9. The other signal is used to close the gate 12 which disengages the clutch 14 and engages the brake 15 and thus stops the rotation of the shaft of the potentiometer VR3. Upon cessation of violent acceleration changes, the output from the differentiating network 18 drops below the pre-set level, no signals are obtained from the output of the trigger circuit 19, the gate 8 opens and integration recommences in the integrator 9. The gate 12 opens and the rotation of the shaft of the potentiometer VR3 recommences.

When the weighing cycle is completed, a print-out and re-set button 20 is operated. This opens the gate 10 and connects the output from the potentiometer VR3 to the printer. After a suitable delay 21 it also closes a gate 22 which disengages the clutch 14 and removes the brake 15 from the shaft of the potentiometer and allows it to return to its end stop under the action of a return spring (not shown). The output from the delay network 21 is also used to re-set the Miller integrator 9.

A limit switch 23 is operated by the shaft of the potentiometer VR3 and is only used if the load should be suspended for such a time that the potentiometer reaches the end of its travel. It duplicates the action of the print-out and re-set button 20.

When the load is lifted by the crane and is stationary the force on the load cell is equal to the mass. Arrangements must be made to ensure that the voltage on the slider of potentiometer VR1 is proportional to the force applied to the load cell when the load is stationary. This is achieved by choosing the law of the potentiometer VR1 so that the output voltages are proportional to $$\left(\frac{\text{force}}{1+\text{acceleration}}\right)$$

where acceleration is expressed as a multiple of g.

The invention has been described with reference to specific details but it will be appreciated that these are given by way of illustration and not limitation. For example instead of the potentiometers VR1 and VR3 these could be replaced by using solid state circuits. Also a tacho generator included in servo 7 could be used to operate the trigger circuit 19 thus rendering amplifier 17 and network 18 unnecessary.

For ease in description we have used the word "mass" to be synonymous with "weight."

I claim:

1. In an apparatus for indicating the mass of a load whilst being lifted in a machine, a member of the machine which suffers strain under the force exerted by the load, a load cell operatively connected with said member influenced by said strain, an electrical circuit for the load cell adapted to give an electrical signal proportional to said force, means for providing a second signal which is a function of the first differential of the velocity of the load with time, and an indication circuit for combining the two signals to give an indication representing the mass of the load.

2. In an apparatus for indicating the mass of a load whilst being lifted in a lifting mechanism, a member of the machine which suffers strain under the force exerted by said load, a load cell operatively connected with said member influenced by said strain, means for impressing the output from the cell, after any required amplification, on a rectifier to produce across a potentiometer a voltage proportional to the said force, means for causing the moving arm of the potentiometer to move to a position representative of a function of the acceleration of the load, said arm being connected to an indicator calibrated in units of mass.

3. In an apparatus for indicating the mass of a load whilst being lifted in a machine, a member of the machine which suffers strain under the force exerted by the load, a load cell operatively connected with said member influenced by said strain, an electrical circuit for the load cell adapted to give an electrical signal proportional to said force, means for providing a second signal which is a function of the first differential of the velocity of the load with time, and an indication circuit for combining the two signals to give an indication representing the mass of the load, means feeding the combined signal to a gate, a signal integrator connected to said gate, a means for eliminating the time factor from the signal output from the said integrator and means for deriving from said second signal a control signal for said gate.

4. In an apparatus for indicating the mass of a load whilst being lifted in a machine, a member of the machine which suffers strain under the force exerted by the load, a load cell operatively connected with said member influenced by said strain, an electrical circuit for the load cell adapted to give an electrical signal proportional to said force, means for providing a second signal which is a function of the first differential of the velocity of the load with time, and an indication circuit for combining the two signals to give an indication representing the mass of the load, means feeding the combined signal to a gate, a signal integrator connected to said gate, means for deriving from the first signal a control signal for said gate to open same only when the first signal exceeds a predetermined amplitude.

5. In an apparatus for indicating the mass of a load whilst being lifted in a machine, a member of the machine which suffers strain under the force exerted by the load, a load cell operatively connected with said member influenced by said strain, an electrical circuit for the load cell adapted to give an electrical signal proportional to said force, means for providing a second signal which is a function of the first differential of the velocity of the load with time, and an indication circuit for combining the two signals to give an indication representing the mass of the load, means feeding the combined signal to a gate, a signal integrator connected to said gate, means for preventing an indication of load mass being given when a change in its acceleration exceeds a predetermined magnitude.

6. Apparatus according to claim 1 in which the mass indicator is preceded in circuit by an averaging circuit.

7. Apparatus according to claim 6 wherein said averaging circuit comprises a Miller integrator.

8. Apparatus according to claim 7 wherein the output of the averaging circuit representing the product of load mass and time is impressed on a time differential means to provide an indication representing load mass.

9. In an apparatus for indicating the mass of a load whilst being lifted in a machine, a member of the machine which suffers strain under the force exerted by the load, a load cell operatively connected with said member influenced by said strain, an electrical circuit for the load cell adapted to give an electrical signal proportional to said force, means for providing a second signal which is a function of the first differential of the velocity of the load with time, means for combining the said signals to produce a third signal representing the mass of the load, a gate for controlling the passage of the said third signal to an averaging means and means or closing said gate when the first signal is below a predetermined magnitude and/or when the second signal is above a predetermined magnitude.

10. Apparatus according to claim 9 wherein the averaging means comprises a member controlled by a synchronous motor whose motion is controlled by signals derived from the first said and second signals.

References Cited by the Examiner
UNITED STATES PATENTS

| | | | |
|---|---|---|---|
| 1,777,670 | 10/1930 | Hausman | 222—55 |
| 2,746,739 | 5/1956 | Philippovic | 177—16 |
| 2,954,969 | 10/1960 | McCullough | 177—211 |
| 2,974,518 | 3/1961 | Jones | 177—16 X |
| 3,115,201 | 12/1963 | Brumbaugh | 177—16 |

LEO SMILOW, *Primary Examiner.*